United States Patent
Tanimoto et al.

(10) Patent No.: US 8,451,894 B2
(45) Date of Patent: May 28, 2013

(54) VIDEO ENCODING METHOD AND DECODING METHOD, APPARATUSES THEREFOR, PROGRAMS THEREFOR, AND STORAGE MEDIA FOR STORING THE PROGRAMS BY USING PARALLAX COMPENSATION

(75) Inventors: Masayuki Tanimoto, Nagoya (JP); Toshiaki Fujii, Tokyo (JP); Kenji Yamamoto, Kodaira (JP); Masaki Kitahara, Yokosuka (JP); Hideaki Kimata, Tokyo (JP); Shinya Shimizu, Yokosuka (JP); Kazuto Kamikura, Yokosuka (JP); Yoshiyuki Yashima, Yokosuka (JP)

(73) Assignees: Nippon Telegraph and Telephone Corporation, Tokyo (JP); National University Corporation Nagoya University, Nagoya (JP)

( * ) Notice: Subject to any disclaimer, the term of this patent is extended or adjusted under 35 U.S.C. 154(b) by 1188 days.

(21) Appl. No.: 12/086,709

(22) PCT Filed: Jan. 4, 2007

(86) PCT No.: PCT/JP2007/050005
§ 371 (c)(1),
(2), (4) Date: Jun. 18, 2008

(87) PCT Pub. No.: WO2007/077989
PCT Pub. Date: Jul. 12, 2007

(65) Prior Publication Data
US 2010/0220784 A1    Sep. 2, 2010

(30) Foreign Application Priority Data
Jan. 5, 2006    (JP) .................................. 2006-000393

(51) Int. Cl.
*H04N 7/12* (2006.01)
*H04N 7/50* (2006.01)
(52) U.S. Cl.
CPC ...................................... *H04N 7/50* (2013.01)
USPC .................................................. 375/240.12

(58) Field of Classification Search
USPC ....................................... 375/240.01, 240.12
IPC ....................................................... H04N 7/12
See application file for complete search history.

(56) References Cited

U.S. PATENT DOCUMENTS

| 5,696,551 A | 12/1997 | Katto |
| 6,163,337 A | 12/2000 | Azuma et al. |

(Continued)

FOREIGN PATENT DOCUMENTS

| JP | H2-130094 A | 5/1990 |
| JP | H9-261653 A | 10/1997 |

(Continued)

OTHER PUBLICATIONS

Wiegand, Thomas, et al., "Overview of the H.264/AVC Video Coding Standard," IEEE Transactions on Circuits and Systems for Video Technology, Jul. 2003, pp. 560-576, vol. 13, No. 7.
Ohm, Jens-Rainer, et al., "A Realtime Hardware System for Stereoscopic Videoconferencing with Viewpoint Adaptation," Signal Processing: Image Communication, Nov. 6, 1998, pp. 147-171, vol. 14, No. 1-2, Elsevier Science Publishers.

(Continued)

*Primary Examiner* — Jay Patel
*Assistant Examiner* — Yulin Sun
(74) *Attorney, Agent, or Firm* — Harness, Dickey & Pierce, P.L.C.

(57) ABSTRACT

By using parallax compensation which performs prediction by using parallax between video images, the video images are encoded as a single video image. Reference parallax for a target image to be encoded is set, wherein the reference parallax is estimated using a reference image; area division in an image frame is set; parallax displacement for each divided area is set, wherein the parallax displacement is the difference between the reference parallax and parallax for the parallax compensation; data of the area division is encoded; and data for indicating the parallax displacement is encoded. During decoding, reference parallax for a target image to be decoded is set, wherein it is estimated using a reference image; data for indicating area division, which is included in encoded data, is decoded; and data of parallax displacement, which is included in the encoded data, is decoded for each area indicated by the area division data.

20 Claims, 9 Drawing Sheets

U.S. PATENT DOCUMENTS 6,430,224 B1 * 8/2002 Naito et al. ............. 375/240.16
2001/0036307 A1 * 11/2001 Hanna et al. ................. 382/154

FOREIGN PATENT DOCUMENTS

| | | |
|---|---|---|
| JP | H9-275578 A | 10/1997 |
| JP | H10-32840 A | 2/1998 |
| JP | 2003-259377 A | 9/2003 |
| RU | 2189120 C2 | 9/2002 |
| TW | 200537396 A | 11/2005 |
| WO | 2004/008762 A1 | 1/2004 |

OTHER PUBLICATIONS

Hideaki Kimata and Masaki Kitahara, "Preliminary results on multiple view video coding (3DAV)," document M10976 MPEG Redmond Meeting, Jul. 2004.

Masayuki Tanimoto, Toshiaki Fujii, "Response to Call for Evidence on Multi-View Video Coding," document Mxxxxx MPEG Hong Kong Meeting, Jan. 2005.

* cited by examiner

VIDEO ENCODING METHOD AND DECODING METHOD, APPARATUSES THEREFOR, PROGRAMS THEREFOR, AND STORAGE MEDIA FOR STORING THE PROGRAMS BY USING PARALLAX COMPENSATION

TECHNICAL FIELD

The present invention relates to encoding and decoding techniques of multi-viewpoint video images.

Priority is claimed on Japanese Patent Application No. 2006-000393, filed Jan. 5, 2006, the contents of which are incorporated herein by reference.

BACKGROUND ART

Multi-viewpoint video images are video images obtained by photographing the same subject and background thereof by using a plurality of cameras at different positions. Below, a video image obtained by a single camera is called a "two-dimensional video image", and a set of two-dimensional video images obtained by photographing the same subject and background thereof is called a "multi-viewpoint video image". There is a strong correlation between two-dimensional video images (of the different cameras) included in the multi-viewpoint video image. If the cameras are synchronized with each other, the frames (of the cameras) corresponding to the same time have captured the subject and background thereof in entirely the same state, so that there is a strong correlation between the cameras.

First, conventional techniques relating to the encoding of two-dimensional video images will be shown. In many known methods of encoding two-dimensional video images, such as H.264, MPEG-4, MPEG-2 (which are international encoding standards), and the like, highly-efficient encoding is performed by means of motion compensation, orthogonal transformation, quantization, variable-length encoding, or the like.

For example, in H.264, each I frame can be encoded by means of intraframe correlation; each P frame can be encoded by means of interframe correlation together with a plurality of past frames; and each B frame can be encoded by means of interframe correlation together with a plurality of past or future frames.

Even though Non-Patent Document 1 discloses the H.264 techniques in detail, the outline thereof will be described below. In each I frame, the frame is divided into blocks (called "macroblocks", the size of each block is 16×16 (pixels)), and intraframe prediction (intra-prediction) is performed in each macroblock. In intra-prediction, each macroblock is further divided into smaller blocks (called "sub-blocks", below), and an individual intra-encoding method can be applied to each sub-block.

In each P frame, intra-prediction or inter-prediction (inter-frame prediction) may be performed in each macroblock. The intra-prediction applied to a P frame is similar to that applied to an I frame. In the inter-prediction, motion compensation is performed. Also in the motion compensation, each macroblock is divided into smaller blocks, and each sub-block may have an individual motion vector and an individual reference image.

Also in each B frame, intra-prediction or inter-prediction can be performed. In the inter-prediction of the B frame, in addition to a past frame, a future frame can be referred to as a reference image in motion compensation. For example, when encoding a frame sequence of "I→B→B→P", the frames can be encoded in the order of "I→P→B→B". Also in each B frame, motion compensation can be performed by referring to an I or P frame. Additionally, similar to the P frame, each sub-block (obtained by dividing a macroblock) can have an individual motion vector.

When performing intra or inter-prediction, a prediction residual is obtained. In each macroblock, a prediction-residual block is subjected to DCT (discrete cosine transform), so as to perform quantization. The obtained quantized values of DCT coefficients are then subjected to variable-length encoding.

In a known method for encoding multi-viewpoint video images, the multi-viewpoint video images are highly efficiently encoded by means of "parallax compensation" in which motion compensation is applied to images obtained by different cameras at the same time. Here, "parallax" is the difference between positions, to which the same point on a subject is projected, on an image plane of cameras which are disposed at different positions.

FIG. 9 is a schematic view showing the concept of parallax generated between such cameras. In the schematic view, an image plane of cameras, whose optical axes are parallel to each other, is looked down vertically. Generally, such points, to which the same point on a subject is projected, on an image plane of different cameras, are called "corresponding points". As parallax can be represented as a positional difference on the relevant image plane, it can be represented as two-dimensional vector data.

In parallax compensation, the corresponding point on an image of a reference camera, which corresponds to a target pixel in an image of a target camera for the relevant encoding, is estimated using a reference image, and the pixel value of the target pixel is predicted by using a pixel value assigned to the corresponding point. Below, such "estimated parallax" is also called "parallax" for convenience of explanation.

Non-Patent Document 2 discloses an encoding method using parallax compensation, and in such a method, parallax data and each prediction residual are encoded with respect to the pixels of a target image to be encoded. More specifically, in the relevant method, parallax compensation is performed for each block as a unit, where such parallax for each unit block is represented using a two-dimensional vector. FIG. 10 is a schematic view showing a parallax vector. That is, in this method, parallax data as a two-dimensional vector and the relevant prediction residual are encoded. As this method does not use camera parameters in encoding, it is effective when camera parameters are unknown.

In addition, when there are a plurality of reference images obtained by different cameras, parallax compensation may be performed using an arbitrary viewpoint image technique. Non-Patent Document 3 discloses parallax compensation using an arbitrary viewpoint image technique. More specifically, each pixel value of an image obtained by a target camera for the relevant encoding is predicted by means of interpolation using the pixel values of corresponding points (belonging to different cameras) which correspond to the relevant pixel. FIG. 11 is a schematic view showing such interpolation. In the interpolation, the value of pixel m in a target image to be encoded is predicted by performing interpolation between pixels m' and m" of reference images 1 and 2, where the pixels m' and m" correspond to the pixel m.

When there are two or more reference images obtained by different cameras (as disclosed in Patent Document 3), parallax from each pixel of a target image (to be encoded) to each reference image can be estimated without using the target image. FIG. 12 is a schematic view for showing the concept of such parallax estimation.

As shown in FIG. 12, in true parallax, the pixel values of corresponding points between the relevant reference images should be almost identical to each other. Therefore, in many parallax estimation methods, with regard to each of various depths, the pixel values of corresponding points between the reference images are compared with each other, and parallax can be estimated based on the depth which brings the closest pixel values. Such a process can be applied to each pixel of a target image to be encoded.

As described above, when there are two or more reference images obtained by different cameras, and parallax estimation is possible on the decoding side, then parallax compensation can be performed on the decoding side by using parallax data for each pixel, without providing parallax data, which is explicitly encoded on the encoding side, to the decoding side.

Non-Patent Document 1: ITU-T Rec.H.264/ISO/IEC 11496-10, "Advanced Video Coding", Final Committee Draft, Document JVT-E022, September 2002.

Non-Patent Document 2: Hideaki Kimata and Masaki Kitahara, "Preliminary results on multiple view video coding (3DAV)", document M10976 MPEG Redmond Meeting, July, 2004.

Non-Patent Document 3: Masayuki Tanimoto, Toshiaki Fujii, "Response to Call for Evidence on Multi-View Video Coding", document Mxxxxx MPEG Hong Kong Meeting, January, 2005.

In conventional techniques, when there are two or more reference images obtained by different cameras, and parallax estimation is possible on the decoding side, then parallax compensation can be performed on the decoding side by using parallax data for each pixel, without providing parallax data, which is explicitly encoded on the encoding side, to the decoding side. Such parallax with regard to a target image to be encoded or decoded, which can be estimated on the encoding or decoding side without using the target image (for the decoding, without decoding the relevant image), is called "reference parallax".

However, reference parallax, which is estimated on the decoding side, is not an optimum one in consideration of the prediction efficiency, and the amount of code assigned to the relevant prediction residual may be increased. When parallax for maximizing the prediction efficiency is computed on the encoding side, and the difference (called "parallax displacement" below) between the computed parallax and the reference parallax is encoded for each pixel, the prediction efficiency can be improved, thereby improving the encoding efficiency with respect to the prediction residual.

However, in such a technique which can be easily anticipated, as the parallax displacement is encoded for each pixel, the amount of code of parallax data increases, so that the total encoding efficiency cannot be high.

DISCLOSURE OF INVENTION

In order to solve the above problem, an object of the present invention is to decrease the amount of code of parallax data without making a considerable sacrifice of the accuracy of parallax compensation.

The most distinctive feature of the present invention in comparison with the conventional techniques is that in order to solve the above-described problems, a process of determining block division and a process of encoding the determined block division data and parallax displacement data for each block are performed, and such data is handled as encoded data.

In a first mode of the video encoding and decoding methods of the present invention, based on the area division, which is set in accordance with the characteristic of a target image to be encoded, parallax displacement data for each divided area can be encoded.

Generally, parallax displacement has a spatial correlation in an image frame. Therefore, when appropriate area division is set, and parallax displacement is encoded for each divided area, then the amount of code of parallax data can be reduced without degrading the prediction efficiency of parallax compensation.

On the video encoding side, in a reference parallax setting step, parallax for a target image to be encoded (i.e., reference parallax) is set using already-encoded data (i.e., reference image), and in an area division setting step, area division in a frame of the target image is set. In a parallax displacement setting step, parallax displacement is set for each divided area set in the area division. Additionally, in an area division data encoding step, area division data for indicating the area division is encoded, and in a parallax displacement data encoding step, parallax displacement data is encoded.

As the reference parallax set in the reference parallax setting step, (i) parallax estimated using reference images based on the principle as shown in FIG. 12 (refer to a third mode as explained later); (ii) parallax based on a parallax image or a three-dimensional model, which is encoded by another device so as to, for example, generate an arbitrary viewpoint image, and sent to the decoding side; or (iii) parallax provided by another method.

On the decoding side, in a reference parallax setting step, similar to the encoding side, reference parallax for a target image to be decoded is set using already-decoded data (i.e., reference image). In an area division data decoding step, the area division data is decoded, and in a parallax displacement data decoding step, the parallax displacement data for each area in accordance with the area division data is decoded.

A second mode of the video encoding and decoding methods of the present invention is basically similar to the above-described first mode. However, in the second mode, area division is performed so as to generate rectangular blocks. More specifically, rectangular block division (refer to FIG. 10 explained later) is defined for each macroblock. Data for such block division can be efficiently encoded by using a known entropy encoding technique (e.g., entropy encoding in H.264).

A third mode of the video encoding and decoding methods of the present invention is basically similar to the above-described first and second modes. However, in the third mode, reference parallax, which is estimated by a plurality of reference images without using a target image to be encoded (i.e., in accordance with the above-described principle as shown by FIG. 12), is used. When reference parallax is estimated using reference images as explained above, it can be estimated by using only data which has already been sent to the decoding side. Therefore, it is possible not to generate additional data to be encoded, so as to estimate the reference parallax.

In accordance with the present invention, in video encoding and decoding methods for estimating parallax by using reference images, spatial correlation of parallax displacement data is used, so that the amount of code of parallax displacement data can be reduced without degrading the prediction efficiency in parallax compensation, thereby improving the total encoding efficiency.

BEST MODE FOR CARRYING OUT THE INVENTION

Figure 1:
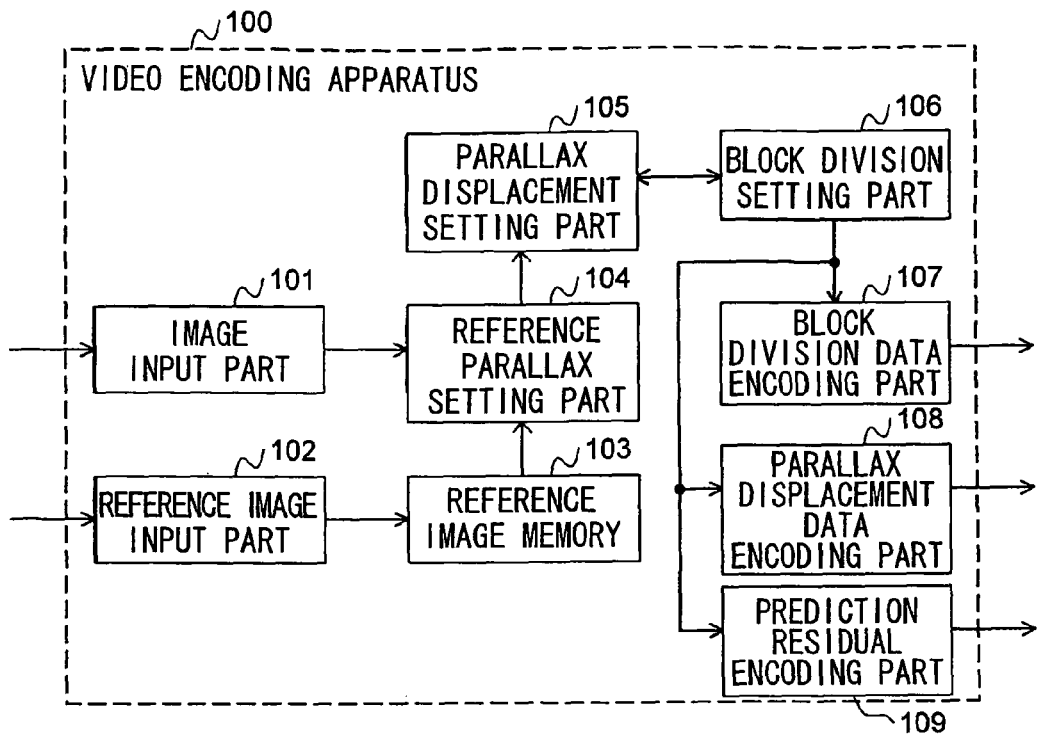
FIG. 1 is a diagram showing a video encoding apparatus as an embodiment of the present invention.

FIG. 1 is a diagram showing the structure of a video encoding apparatus as a embodiment of the present invention.

The video encoding apparatus 100 includes an image input part 101 into which an original image of camera C (i.e., target image to be encoded) is input; a reference image input part 102 into which decoded images (as reference images) of cameras A and B are input; a reference image memory 103 for storing each reference image; a reference parallax setting part 104 for obtaining reference parallax by using reference images; a parallax displacement setting part 105 for obtaining parallax displacement; a block division setting part 106 for setting a block division state; a block division data encoding part 107 for encoding block division data; a parallax displacement data encoding part 108 for encoding parallax displacement data; and a prediction residual encoding part 109 for encoding the relevant prediction residual.

Figure 2:
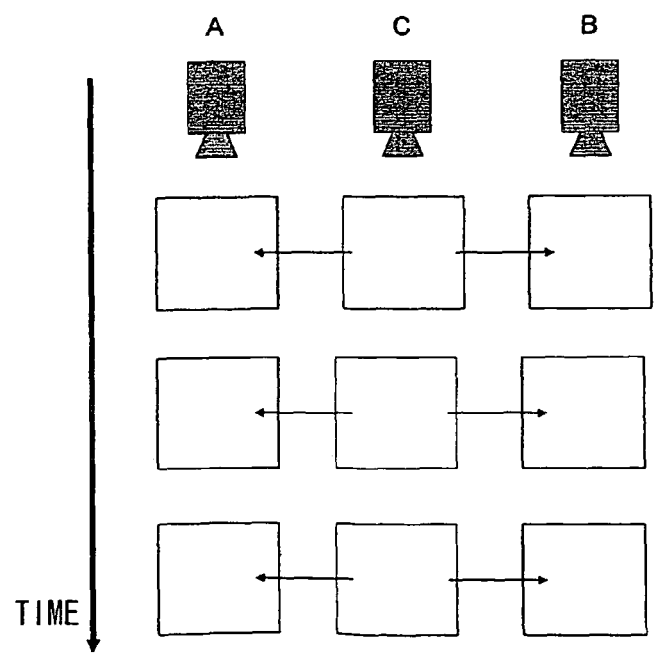
FIG. 2 is a diagram showing reference relationships between cameras in the embodiment.

FIG. 2 is a diagram showing reference relationships between cameras in the present embodiment. As shown in FIG. 2, in the present embodiment for encoding multi-viewpoint video images obtained by three cameras, video images of camera C are encoded using decoded images of cameras A and B, as reference images.

The arrows in FIG. 2 represent reference relationships in parallax compensation. In order to encode each image of camera C, decoded images (of cameras A and B) having the same display time are encoded as reference images. In the relevant process, a predicted image is generated by computing an average between pixel values of the corresponding points belonging to the cameras A and B (each corresponding point is a pixel indicated by a vector which is provided by the sum of the relevant parallax displacement vector and reference parallax vector).

Figure 3:
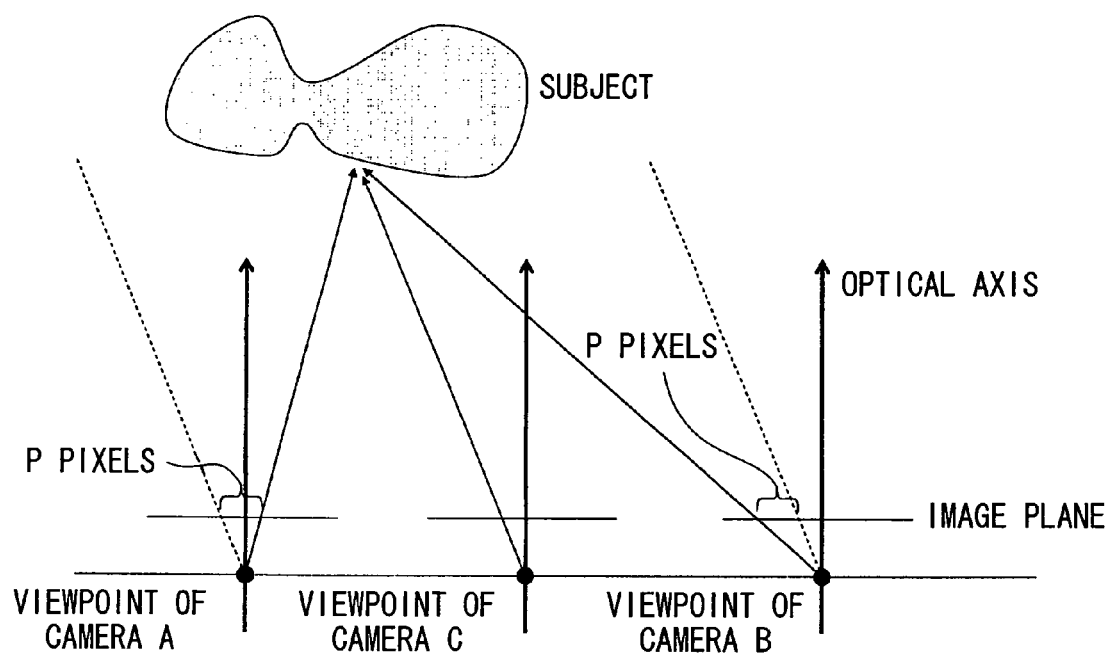
FIG. 3 is a diagram showing the arrangement of cameras in the embodiment.

FIG. 3 is a diagram showing the arrangement of cameras in the present embodiment. In the present embodiment, as shown in FIG. 3, the viewpoints of the three cameras align along a straight line at regular intervals, and the optical axes of the cameras are perpendicular to the straight line. That is, the optical axes of the three cameras are parallel to each other.

In addition, the x-y coordinate system on the relevant image plane can be obtained by parallel translation (no rotation or the like is performed) with respect to the straight line on which the cameras are arranged, and pixels are formed by dividing each of the x and y axes of the image plane at regular intervals for each camera. That is, each camera has the same resolution, and a parallax of P pixels between the cameras C and A corresponds to a parallax of P pixels between the cameras C and B.

Figure 4:
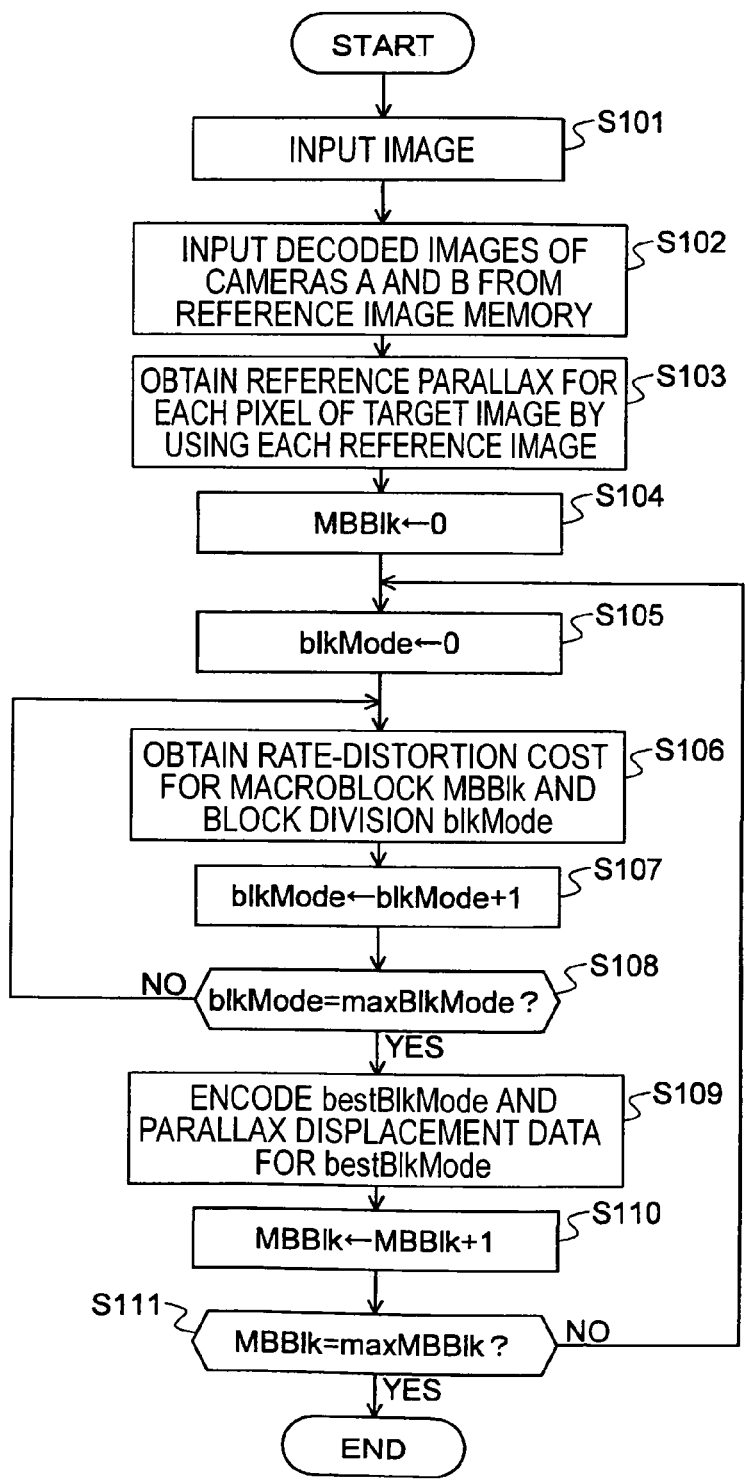
FIG. 4 is a flowchart of encoding in the embodiment.
Figure 5:
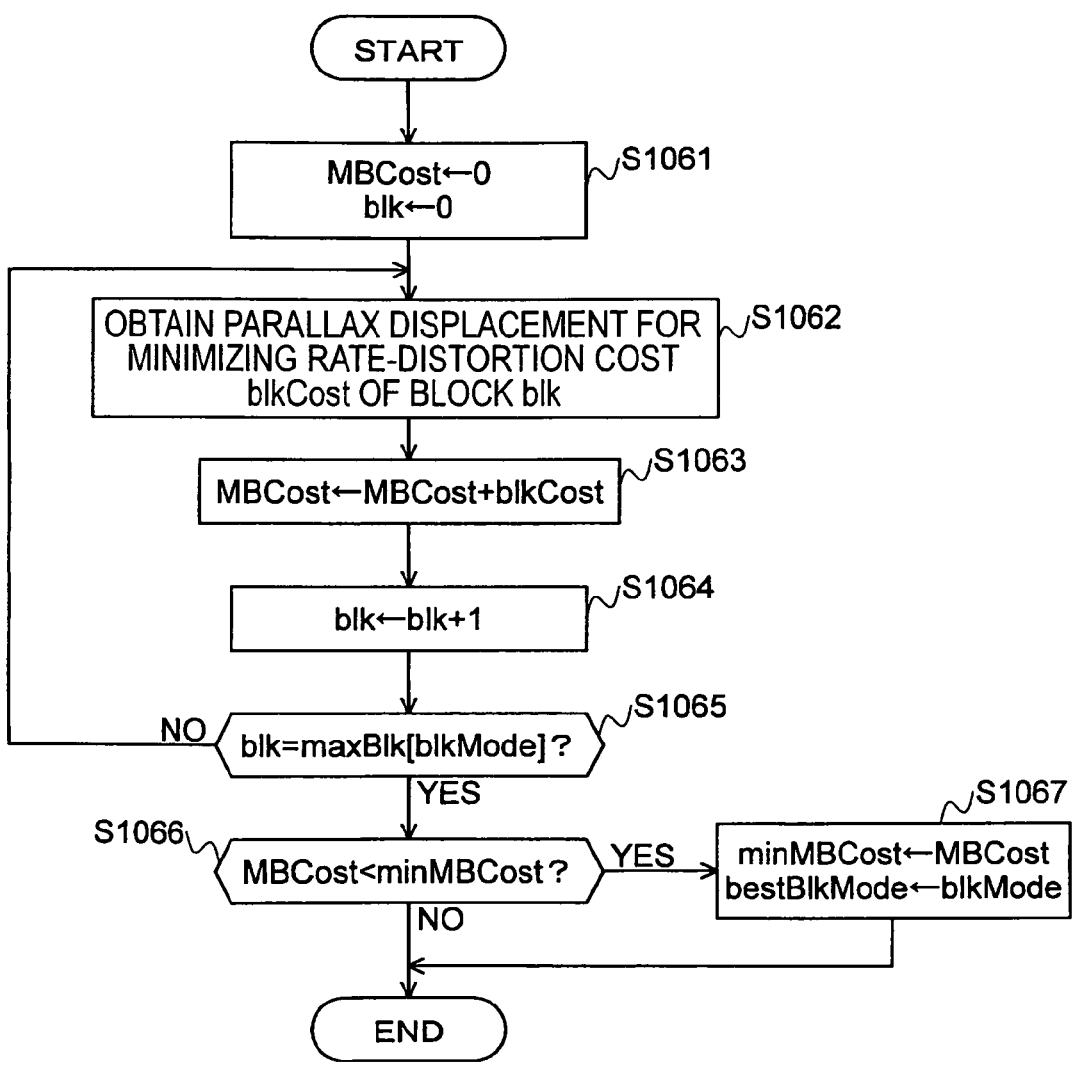
FIG. 5 is a detailed flowchart of step S106 in FIG. 4.

FIG. 4 is a flowchart of encoding in the present embodiment. FIG. 5 is a detailed flowchart of step S106 in FIG. 4.

In the present embodiment, a macroblock consisting of 16×16 pixels (in the vertical and horizontal directions) is used as a unit, and the block division (state) in each macroblock is designated. Parallax displacement data is obtained for each block defined in the block division (simply called the "block" for convenience), and is encoded.

Reference parallax is represented using a two-dimensional vector. Therefore, on the decoding side (and the encoding side), a two-dimensional vector (i.e., reference parallax) for each reference image is obtained for each pixel, by using the reference image.

On the other hand, a single parallax displacement (for camera A) represented by a two-dimensional vector is encoded for each block. Here, similar to the computation of the reference parallax, a physical restriction condition is assumed in which each (parallax) vector (used for parallax compensation), which is provided as the sum of a reference parallax vector and a reference parallax vector for each pixel of each of the reference images, designates the same position on the subject. In this case, if the parallax displacement vector for camera A is known, the parallax displacement vector for another camera is uniquely determined.

Instead, parallax displacement for each reference image may be independently computed and encoded without assuming such a restriction condition. However, such a method can be easily implemented as a variation of the present embodiment, and specific explanations thereof are omitted.

Figure 6:
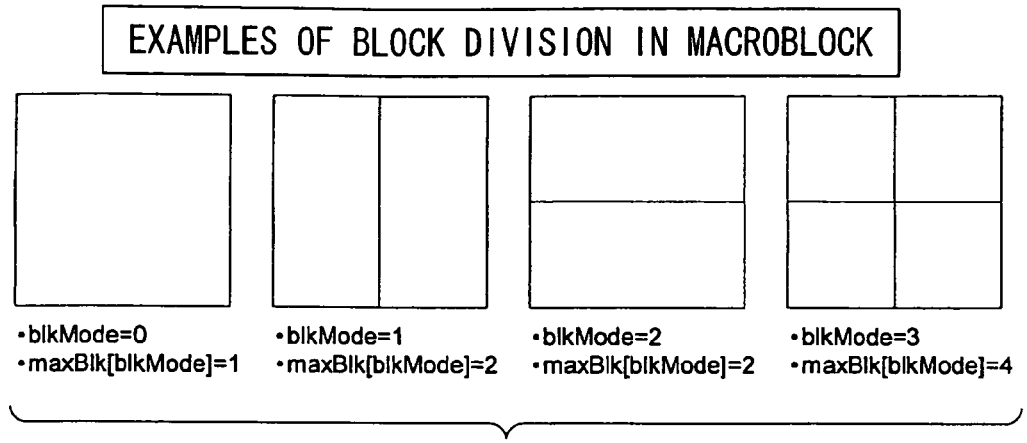
FIG. 6 is a diagram showing examples of block division in each macroblock.

There are many possible block division states applicable to each macroblock. FIG. 6 shows examples thereof. As shown in FIG. 6, "blkMode" is an index for indicating the type of block division, and the number of blocks for each "blkMode" is indicated by "maxBlk[blkMode]".

Under the above conditions, the encoding operation will be explained with reference to the flowchart of FIG. 4.

First, an image of camera C is input into the image input part 101 (see step S101), where decoded images, which belong to cameras A and B and have the same display time, have been stored into the reference image memory 103 via the reference image input part 102.

Next, the relevant decoded images of cameras A and B are input from the reference image memory 103 (see step S102), and reference parallax for each pixel of a target image to be encoded is obtained for each input reference image by using the reference images (see step S103). That is, two reference images, which belong to cameras A and B, are input into the reference parallax setting part 104, and reference parallax for each pixel of the target image of camera C is obtained.

Accordingly, two "two-dimensional vectors" are obtained for each pixel of the target image of camera C. For coordinates (x,y) on the image plane of camera C (x and y are each an integer which indicates a coordinate value of the relevant pixel), reference parallax vectors for cameras A and B are respectively indicated by $d_A[x,y]$ and $d_B[x,y]$.

In addition, "MBBlk" is an index for indicating each macroblock, and the number of macroblocks is indicated by "maxMBBlk".

After the index MBBlk for each macroblock is initialized to zero (see step S104), the following steps (S105 to S111) are repeatedly applied to each macroblock while "1" is added to the index MBBlk (see step S110).

First, after the block division (index) blkMode is initialized to zero (see step S105), a rate-distortion cost for the relevant macroblock MBBlk and the block division blkMode is computed (see step S106) while "1" is added to the block division blkMode (see step S107), until the block division blkMode reaches the maximum index value "maxBlkMode" (see step S108). That is, in the parallax displacement setting part 105, the rate-distortion cost "MBCost" for each block division blkMode is computed.

The rate-distortion cost MBCost for any block division blkMode is obtained by computing a rate-distortion cost "blk-Cost" for each block (the total number of blocks is indicated by "maxBlk[blkMode]"), and computing the total sum of the rate-distortion costs blkCost.

The rate-distortion cost blkCost for any block can be obtained as the minimum value of the rate-distortion cost "cost" obtained when using a parallax displacement vector. Therefore, for each block, the parallax displacement vector for minimizing "cost" and the "cost" itself should be computed.

Here, the search for parallax displacement used for encoding is performed in the vicinity of the relevant reference parallax. That is, "$e_0, e_1, \ldots, e_{N-1}$" are defined as candidates for the parallax displacement vector, and a process of computing the rate-distortion cost for the parallax vector "$d_A[x, y]+e_n$" is repeated for "n=0, 1, ..., N−1", so as to encode the optimum parallax vector for the present block.

In order to compute "cost", first, the total sum "$SAD[e_n]$" of the absolute values of prediction residual for the relevant block, which is obtained when using a parallax displacement vector $e_n$, is computed. In addition, an estimated amount $R[e_n]$ of code of the parallax displacement vector, which is obtained when encoding a parallax displacement vector $e_n$, is also computed. The "cost" is computed by the following formula:

$$\text{Cost}=SAD[e_n]+\lambda R[e_n] \quad (1)$$

Next, in the block division setting part 106, block division "bestBlkMode" for minimizing the rate-distortion cost MBCost is computed for each macroblock MBBlk (the corresponding parallax displacement vector has already been obtained).

FIG. 5 shows the detailed process of step S106.

First, the rate-distortion cost MBCost of the relevant macroblock and the index value of block "blk" are each initialized to zero (see step S1061), and the parallax displacement vector for minimizing the rate-distortion cost blkCost of the block "blk" is obtained (see step S1062).

After the obtained rate-distortion cost blkCost of the relevant block is added to the rate-distortion cost MBCost of the macroblock (see step S1063), "1" is added to block "blk", and the steps S1062 to S1064 are repeated until the block "blk" reaches the total number maxBlk[blkMode] of blocks (see step S1065).

When the block "blk" reaches the total number maxBlk [blkMode] of blocks, it is determined whether or not the presently-computed rate-distortion cost MBCost of the macroblock is smaller than the presently-minimum rate-distortion cost minMBCost of the macroblock (see step S1066). If t is smaller, the rate-distortion cost MBCost is stored as the minimum rate-distortion cost minMBCost, and the corresponding block division blkMode is stored as the optimum block division bestBlkMode (see step S1067).

In accordance with the above operation, the block division data "bestBlkMode", the parallax displacement data (i.e., parallax displacement vector), and the prediction residual generated by parallax compensation, which are used for parallax compensation of the macroblock MBBlk, are obtained. Next, the block division data "bestBlkMode" is encoded in the block division data encoding part 107, and the parallax displacement data corresponding to bestBlkMode is encoded in the parallax displacement data encoding part 108 (see step S109).

In addition, the prediction residual corresponding to the parallax displacement data is encoded in the prediction residual encoding part 109.

Figure 7:
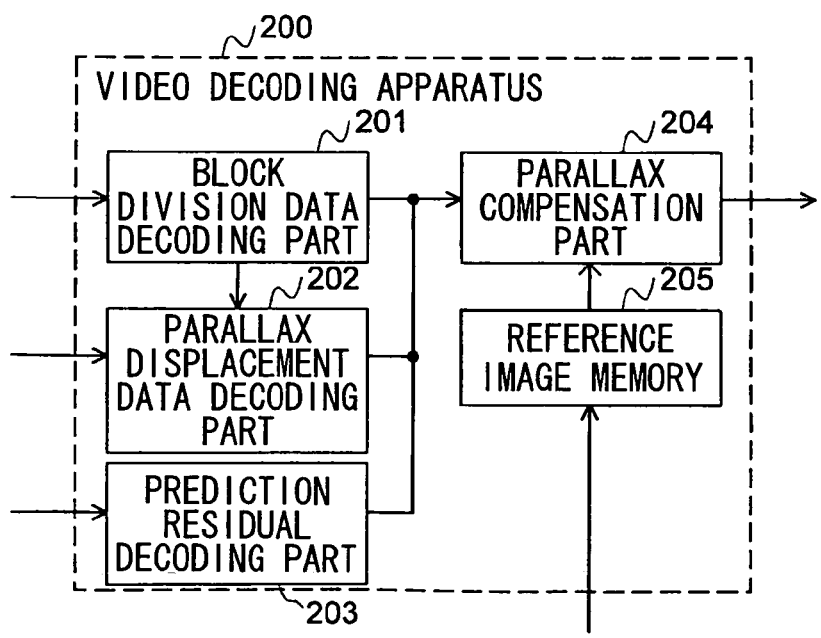
FIG. 7 is a diagram showing a video decoding apparatus in the embodiment.

FIG. 7 shows a video decoding apparatus used in the present embodiment. The video decoding apparatus 200 includes a block division data decoding part 201; a parallax displacement data decoding part 202; a prediction residual decoding part 203; a parallax compensation part 204; and a reference image memory 205.

Figure 8:
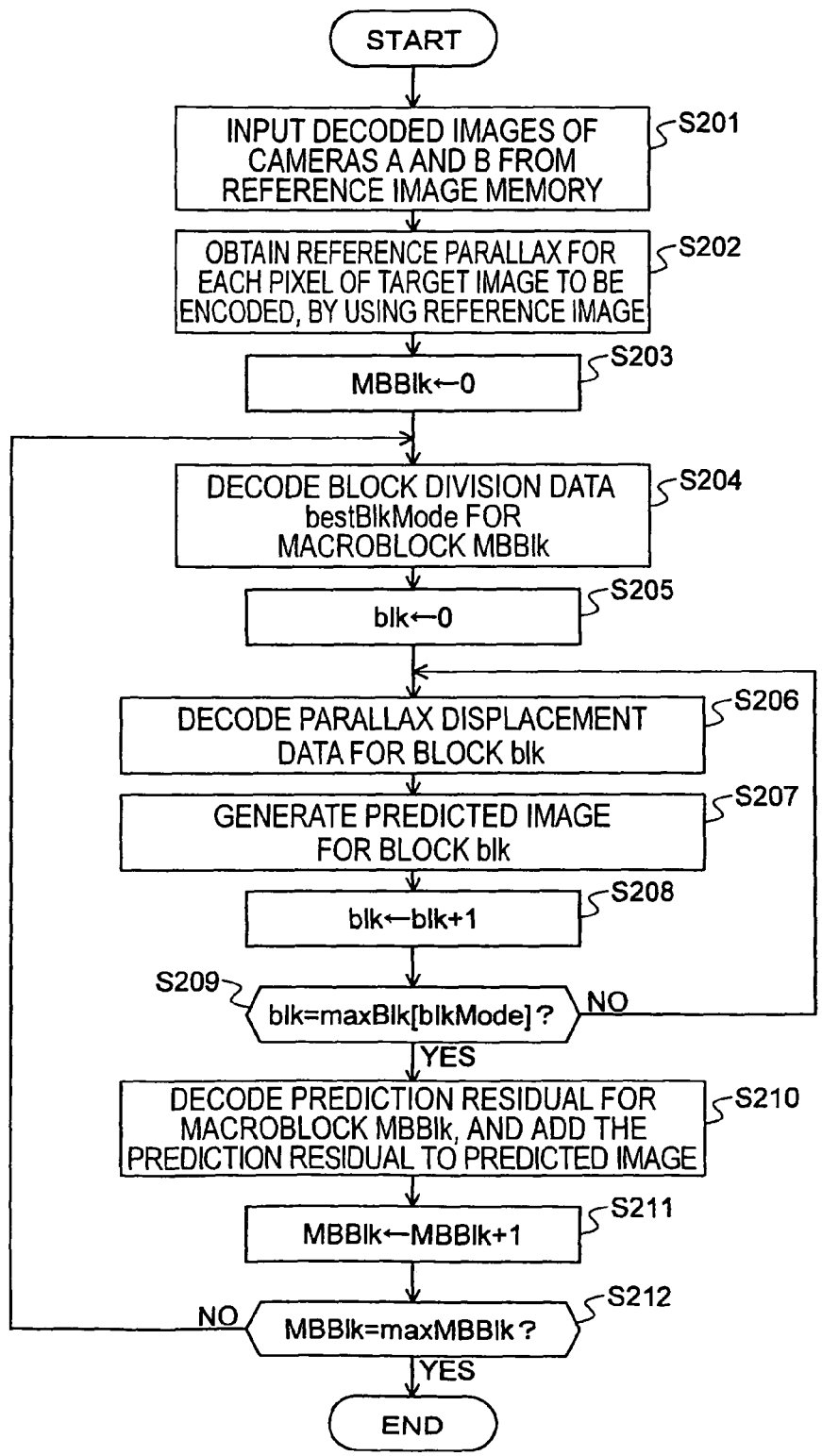
FIG. 8 is a flowchart of decoding in the embodiment.
Figure 9:
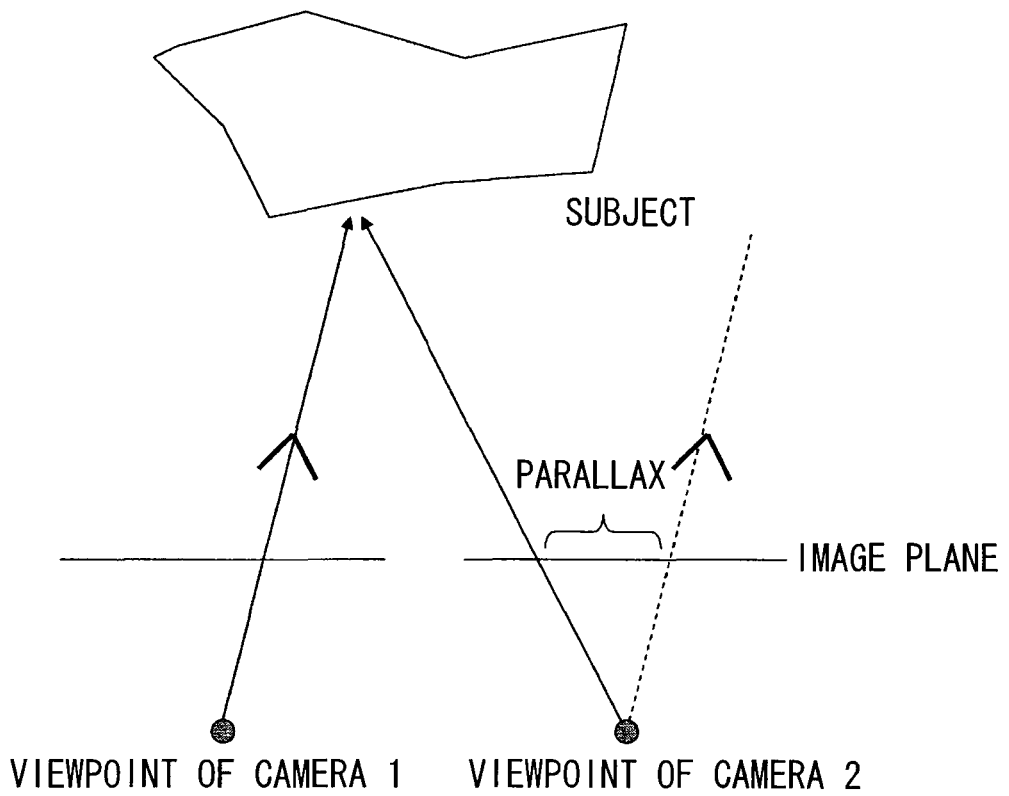
FIG. 9 is a schematic view showing the concept of parallax generated between cameras.
Figure 10:
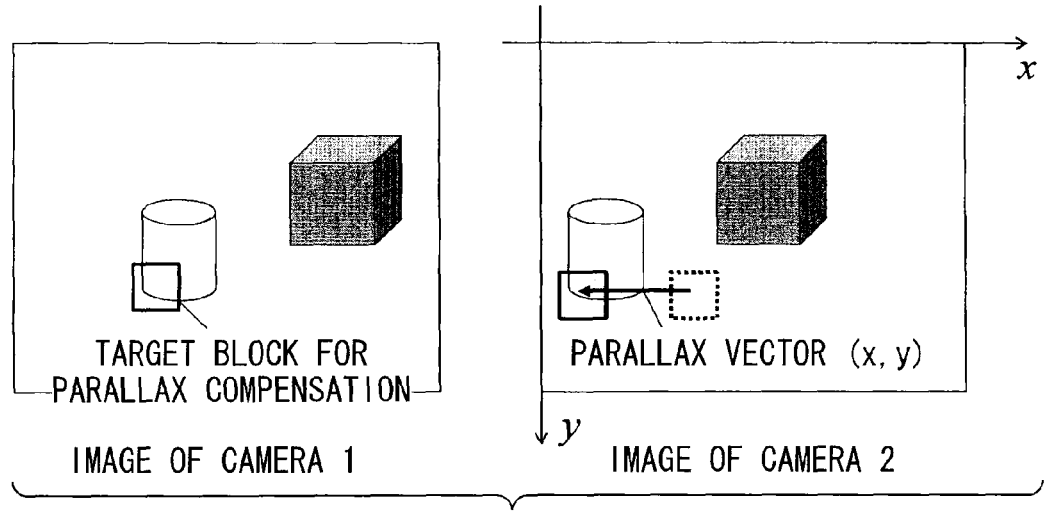
FIG. 10 is a schematic view showing a parallax vector.
Figure 11:
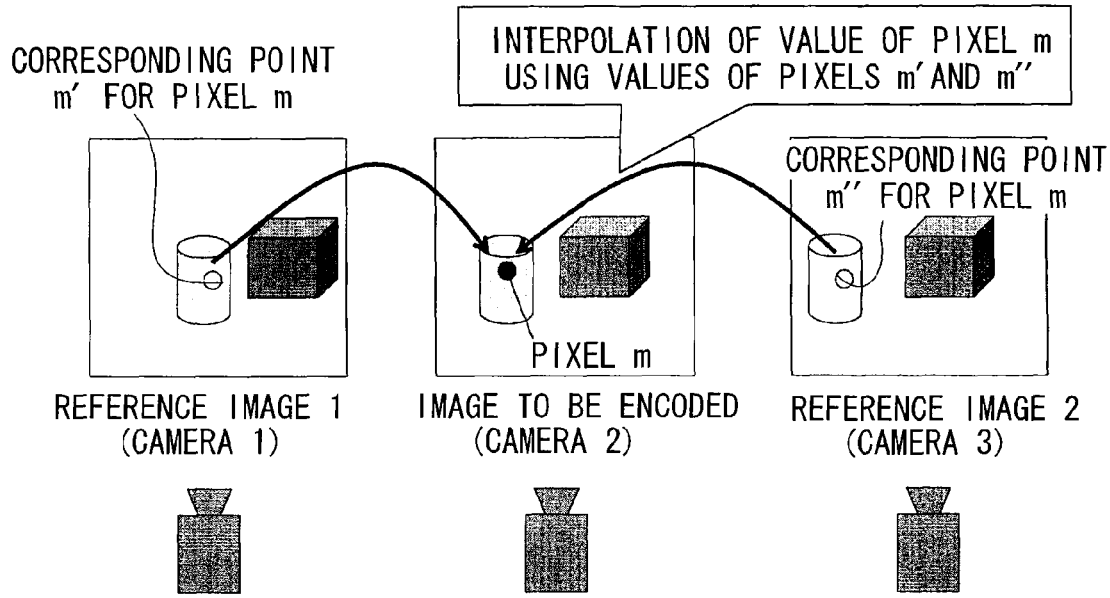
FIG. 11 is a schematic view showing pixel-value interpolation.
Figure 12:
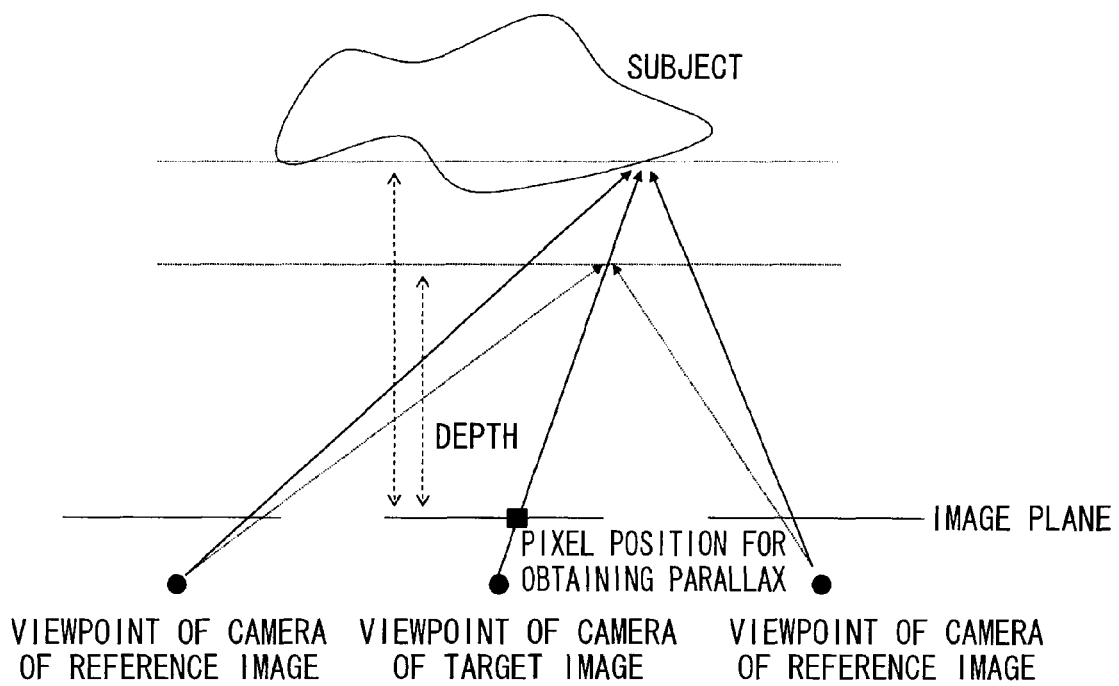
FIG. 12 is a schematic view showing the concept of parallax estimation.

FIG. 8 is a flowchart of the decoding using the video decoding apparatus 200 in the present embodiment. This flowchart shows the operation for decoding one frame of camera C, and will be explained in detail below. Here, the frames of cameras A and B of the same time have been decoded in advance, and the decoded images have been stored in the reference image memory 205.

First, the relevant decoded images of cameras A and B are input from the reference image memory 205 (see step S201), and reference parallax for each pixel of a target image to be encoded is obtained using each reference image (see step S202). That is, two reference images belonging to cameras A and B are input into the parallax compensation part 204, and parallax compensation for each pixel of the relevant image of camera C is obtained. Accordingly, two "two-dimensional vectors" are obtained for each pixel in the image of camera C.

Next, after the index MBBlk of macroblock is initialized to zero (see step S203), the following steps (S204 to S212) are repeated for each macroblock of the relevant one frame while "1" is added to MBBlk (see step S211) ("maxMBBlk" indicates the number of macroblocks in one frame). Accordingly, the relevant one frame of camera C is decoded.

In the decoding of each macroblock, first, the block division data bestBlkMode for the macroblock MBBlk is decoded by the block division data decoding part 201 (see step S204). Next, after the index value of block "blk" is initialized to zero (see step S205), the following steps (S206 to S209) are repeated for each block "blk" ("maxBlk[blk-Mode]" indicates the maximum number of block).

First, in the parallax displacement data decoding part 202, the parallax displacement data for block "blk" is decoded (see step S206), and an predicted image for block "blk" is generated using the parallax displacement data and the reference parallax (i.e., by performing interpolation between the pixel values of cameras A and B) (see step S207).

In accordance with the above repetition process for block "blk", an predicted image for macroblock MBBlk is generated. Therefore, the prediction residual for the macroblock MBBlk is decoded in the prediction residual decoding part 203, and the parallax compensation part 204 computes the sum of the predicted image and the prediction residual, thereby obtaining a decoded image of macroblock MBBlk (see step S210).

The above operation is repeated for every macroblock in the relevant one frame (see steps S211 and S212), thereby decoding the one frame of camera C.

In the present embodiment, an image of camera C is encoded by referring to other cameras (A and B). However, such a case of performing the encoding by referring to other cameras and another case of performing motion compensation by referring to a decoded image of camera C may be adaptively switched in an image frame (i.e., for an image).

More specifically, switching between parallax compensation and motion compensation may be performed for each divided block shown in FIG. 6. In this case, the video encoding side should encode data for indicating which of parallax compensation and motion compensation has been used, and the video decoding side should decode the data.

The above-described video encoding and decoding processes can be implemented by using a computer and a software program. Such a program may be provided by storing it into a computer-readable storage medium, or through a network.

INDUSTRIAL APPLICABILITY

In video encoding and decoding methods for estimating parallax by using reference images, spatial correlation of parallax displacement data is used, so that the amount of code of parallax displacement data can be reduced without degrading the prediction efficiency in parallax compensation, thereby improving the total encoding efficiency.

The invention claimed is:

1. A video encoding method for encoding video images as a single video image by using parallax compensation which performs prediction by using parallax between the video images, the method comprising:
   a reference parallax setting step of setting reference parallax for each pixel in a target image to be encoded, wherein the reference parallax is estimated using a reference image;
   an area division setting step of setting area division in an image frame;
   a parallax displacement setting step of setting parallax displacement for each divided area set in the area division setting step, wherein the parallax displacement is the difference between the reference parallax and parallax used for the parallax compensation and has a common value within each divided area;
   a predicted image generating step of generating a predicted image for the parallax compensation, for each pixel (x, y) of the target image, by using parallax which is obtained for the pixel as a unit by adding the set reference parallax $d_A [x,y]$ to the common parallax displacement $e_n$ which is set for the area to which the pixel belongs according to the formula $d_A [x, y]+e_n$ which is repeated for n=0, 1, ..., N−1, where N is the number of candidates for the common parallax displacement so as to determine one optimum common parallax displacement e;
   an area division data encoding step of encoding area division data for indicating the area division which is set in the area division setting step; and
   a parallax displacement data encoding step of encoding parallax displacement data for indicating the parallax displacement which is set in the parallax displacement setting step.

2. The video encoding method in accordance with claim 1, wherein:
   the area division set in the area division setting step is performed by a method selected from among a plurality of area division methods for performing area division into rectangular blocks.

3. The video encoding method in accordance with claim 1, wherein:
   the reference parallax set in the reference parallax setting step is estimated using a plurality of reference images without using the target image to be encoded.

4. The video encoding method in accordance with claim 3, wherein:
   the reference parallax is estimated for each pixel as a unit, by using the reference images.

5. A video decoding method for decoding video images as a single video image by using parallax compensation which performs prediction by using parallax between the video images, the method comprising:
   a reference parallax setting step of setting reference parallax for each pixel in a target image to be decoded, wherein the reference parallax is estimated using a reference image;
   an area division data decoding step of decoding area division data for indicating area division, where the area division data is included in encoded data;
   a parallax displacement data decoding step of decoding data of parallax displacement for each area indicated by the area division data which is decoded in the area division data decoding step, wherein the data of parallax displacement is included in the encoded data, and the parallax displacement is the difference between the reference parallax and parallax used for the parallax compensation and has a common value within each area indicated by the area division data; and
   a predicted image generating step of generating a predicted image for the parallax compensation, for each pixel (x, y) of the target image, by using parallax which is obtained for the pixel as a unit by adding the set reference parallax $d_A [x,y]$ to optimum common parallax displacement e which is set for the area to which the pixel belongs, according to the formula $d_A [x, y]+e$, wherein the optimum common parallax displacement is included in the encoded data and decoded in the parallax displacement data decoding step.

6. The video decoding method in accordance with claim 5, wherein:
   the area division data decoded in the area division data decoding step indicates a method selected from among a plurality of area division methods for performing area division into rectangular blocks.

7. The video decoding method in accordance with claim 5, wherein:
   the parallax displacement data decoded in the parallax displacement data decoding step is data of the difference between the reference parallax, which is estimated using a plurality of reference images without using the target image to be decoded, and the parallax used for the parallax compensation.

8. The video decoding method in accordance with claim 7, wherein:
   the reference parallax is estimated for each pixel as a unit, by using the reference images.

9. A video encoding apparatus for encoding video images as a single video image by using parallax compensation which performs prediction by using parallax between the video images, the apparatus comprising:
   a reference parallax setting device for setting reference parallax for each pixel in a target image to be encoded, wherein the reference parallax is estimated using a reference image;
   an area division setting device for setting area division in an image frame;
   a parallax displacement setting device for setting parallax displacement for each divided area set by the area division setting device, wherein the parallax displacement is the difference between the reference parallax and parallax used for the parallax compensation and has a common value within each divided area;
   a predicted image generating device for generating a predicted image for the parallax compensation, for each pixel (x, y) of the target image, by using parallax which is obtained for the pixel as a unit by adding the set reference parallax $d_A [x, y]$ to the common parallax displacement $e_n$ which is set for the area to which the pixel belongs, according to the formula $d_A [x, y]+e_n$ which is repeated for n=0, 1, . . . , N−1, where N is the number of candidates for the common parallax displacement so as to determine one optimum common parallax displacement e;

an area division data encoding device for encoding area division data for indicating the area division which is set by the area division setting device; and a parallax displacement data encoding device for encoding parallax displacement data for indicating the parallax displacement which is set by the parallax displacement setting device.

10. A video decoding apparatus for decoding video images as a single video image by using parallax compensation which performs prediction by using parallax between the video images, the apparatus comprising:

a reference parallax setting device for setting reference parallax for each pixel in a target image to be decoded, wherein the reference parallax is estimated using a reference image;

an area division data decoding device for decoding area division data for indicating area division, where the area division data is included in encoded data;

a parallax displacement data decoding device for decoding data of parallax displacement for each area indicated by the area division data which is decoded by the area division data decoding device, wherein the data of parallax displacement is included in the encoded data, and the parallax displacement is the difference between the reference parallax and parallax used for the parallax compensation and has a common value within each area indicated by the area division data; and a predicted image generating device for generating a predicted image for the parallax compensation, for each pixel (x, Y) of the target image, by using parallax which is obtained for the pixel as a unit by adding the set reference parallax $d_A [x, y]$ to optimum common parallax displacement e which is set for the area to which the pixel belongs, according to the formula $d_A [x, y]+e$, wherein the optimum common parallax displacement is included in the encoded data and decoded by the parallax displacement data decoding device.

11. A non-transitory computer-readable storage medium which stores a video encoding program for making a computer execute the video encoding method in accordance with claim 1.

12. A non-transitory computer-readable storage medium which stores a video decoding program for making a computer execute the video decoding method in accordance with claim 5.

13. The video encoding method in accordance with claim 1, wherein:
the reference parallax for each pixel, which is set in the reference parallax setting step, is estimated using a plurality of reference images without using the target image to be encoded; and
in the predicted image generating step, the predicted image is generated based on pixel values of the reference images.

14. The video encoding method in accordance with claim 13, wherein:
in the predicted image generating step, the predicted image is generated by computing an average between the pixel values of the reference images.

15. The video decoding method in accordance with claim 5, wherein:
the reference parallax for each pixel, which is set in the reference parallax setting step, is estimated using a plurality of reference images without using the target image to be decoded; and
in the predicted image generating step, the predicted image is generated based on pixel values of the reference images.

16. The video decoding method in accordance with claim 15, wherein:
in the predicted image generating step, the predicted image is generated by computing an average between the pixel values of the reference images.

17. The video encoding apparatus in accordance with claim 9, wherein:
the reference parallax setting device estimates the reference parallax for each pixel by using a plurality of reference images without using the target image to be encoded; and
the predicted image generating device generates the predicted image based on pixel values of the reference images.

18. The video encoding apparatus in accordance with claim 17, wherein:
the predicted image generating device generates the predicted image by computing an average between the pixel values of the reference images.

19. The video decoding apparatus in accordance with claim 10, wherein:
the reference parallax setting device estimates the reference parallax for each pixel by using a plurality of reference images without using the target image to be decoded; and
the predicted image generating device generates the predicted image based on pixel values of the reference images.

20. The video decoding apparatus in accordance with claim 19, wherein:
the predicted image generating device generates the predicted image by computing an average between the pixel values of the reference images.

* * * * *